US012608708B2

(12) United States Patent
Nakayama

(10) Patent No.: US 12,608,708 B2
(45) Date of Patent: Apr. 21, 2026

(54) INFORMATION COMMUNICATION DEVICE AND INFORMATION COMMUNICATION PROGRAM

(71) Applicant: Saga University, Saga (JP)

(72) Inventor: Koichi Nakayama, Saga (JP)

(73) Assignee: Saga University

(*) Notice: Subject to any disclaimer, the term of this patent is extended or adjusted under 35 U.S.C. 154(b) by 0 days.

(21) Appl. No.: 19/068,005

(22) Filed: Mar. 3, 2025

(65) Prior Publication Data

US 2026/0065268 A1      Mar. 5, 2026

(30) Foreign Application Priority Data

Sep. 2, 2024     (JP) ................................. 2024-150826

(51) Int. Cl.
*G06Q 20/40*        (2012.01)
*G06Q 20/38*        (2012.01)
*H04L 9/08*         (2006.01)

(52) U.S. Cl.
CPC ....... *G06Q 20/401* (2013.01); *G06Q 20/3829* (2013.01); *H04L 9/0825* (2013.01)

(58) Field of Classification Search
CPC . G06Q 20/401; G06Q 20/3829; H04L 9/0825
See application file for complete search history.

(56) References Cited

U.S. PATENT DOCUMENTS 9,026,556 B2 * 5/2015 Imamura ................. G06F 16/27
                                                  707/791
2023/0054245 A1 * 2/2023 Wright .................. H04L 9/3236

FOREIGN PATENT DOCUMENTS

| CN | 111813788 A | 10/2020 | |
| CN | 113592488 A | * 11/2021 | ........ G06Q 20/3829 |
| JP | 2021-136470 A | 6/2008 | |
| JP | 2010-122724 A | 6/2010 | |
| JP | 4817404 B2 | 11/2011 | |
| JP | 6583841 B1 | 10/2019 | |
| JP | 2020-003907 A | 4/2022 | |
| JP | 2022-166870 A | 11/2022 | |
| JP | 2023-515369 A | 4/2023 | |

(Continued)

*Primary Examiner* — Yingying Zhou
(74) *Attorney, Agent, or Firm* — Best Mode IP Law, PLLC; Yusuke Hirai

(57) ABSTRACT

An information communication device that can share information using a blockchain on a network connected in a peer-to-peer manner. The device includes: a group information storage unit 12 that stores group information shared among members; a transaction issuance unit 18 that issues a transaction to a blockchain 4 when one member has performed a predetermined operation to change a content of one group information, the transaction indicating that the one group information has been changed; a transmission unit 14 that transmits the one group information after the change processing to another member; a transaction confirmation unit 20 that accesses, when reception of another group information from another member is detected, the blockchain 4 to confirm presence or absence of another transaction indicating that another group information has been changed; and an update processing unit 22 that reflects the another group information as legitimate information when there is the another transaction.

6 Claims, 11 Drawing Sheets

(56)          References Cited

FOREIGN PATENT DOCUMENTS

| | | | |
|---|---|---|---|
| JP | 2024-013379 A | 2/2024 | |
| KR | 20220124674 A * | 9/2022 | ............... H04L 9/50 |

* cited by examiner

FIG. 3

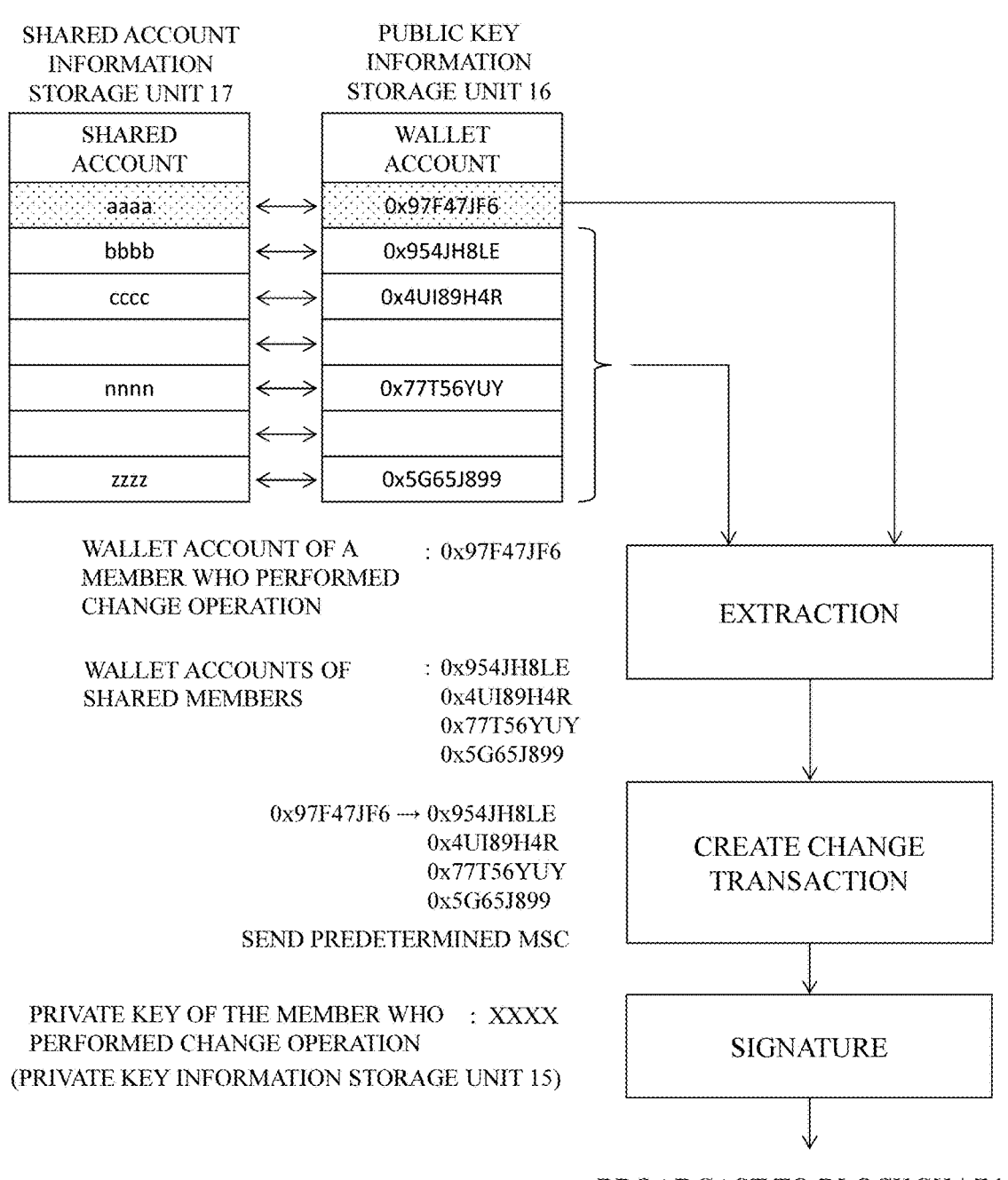

SHARED ACCOUNT
INFORMATION
STORAGE UNIT 17

PUBLIC KEY
INFORMATION
STORAGE UNIT 16

WALLET ACCOUNT OF A          : 0x97F47JF6
MEMBER WHO PERFORMED
CHANGE OPERATION

WALLET ACCOUNTS OF          : 0x954JH8LE
SHARED MEMBERS              0x4UI89H4R
                           0x77T56YUY
                           0x5G65J899

0x97F47JF6 → 0x954JH8LE
            0x4UI89H4R
            0x77T56YUY
            0x5G65J899

SEND PREDETERMINED MSC

PRIVATE KEY OF THE MEMBER WHO   : XXXX
PERFORMED CHANGE OPERATION
(PRIVATE KEY INFORMATION STORAGE UNIT 15)

EXTRACTION

CREATE CHANGE
TRANSACTION

SIGNATURE

BROADCAST TO BLOCKCHAIN 4

FIG. 5

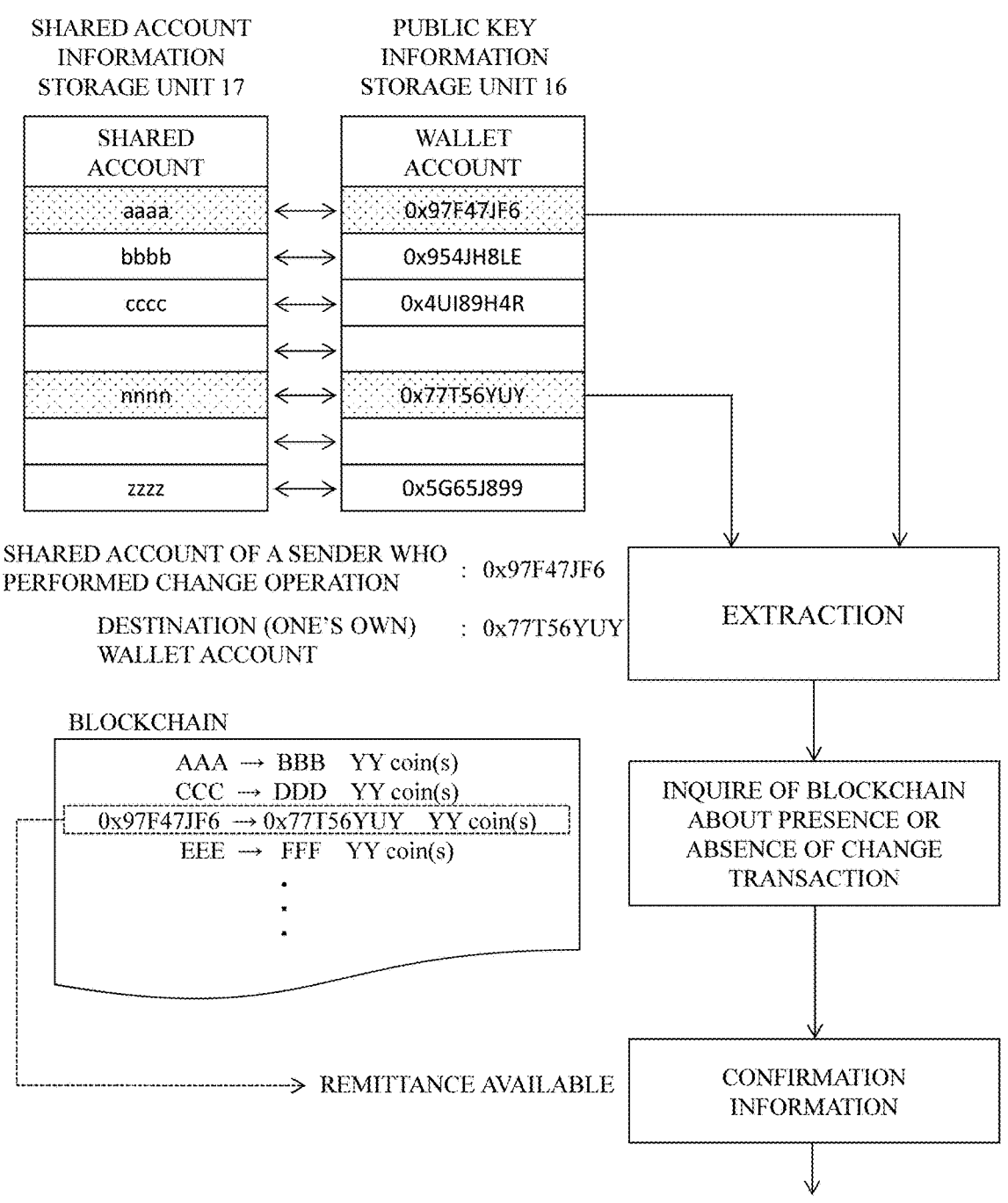

SHARED ACCOUNT
INFORMATION
STORAGE UNIT 17

PUBLIC KEY
INFORMATION
STORAGE UNIT 16

| SHARED ACCOUNT | | WALLET ACCOUNT |
|---|---|---|
| aaaa | ←→ | 0x97F47JF6 |
| bbbb | ←→ | 0x954JH8LE |
| cccc | ←→ | 0x4UI89H4R |
| | ←→ | |
| nnnn | ←→ | 0x77T56YUY |
| | ←→ | |
| zzzz | ←→ | 0x5G65J899 |

SHARED ACCOUNT OF A SENDER WHO
PERFORMED CHANGE OPERATION : 0x97F47JF6

DESTINATION (ONE'S OWN) : 0x77T56YUY
WALLET ACCOUNT

BLOCKCHAIN

AAA → BBB    YY coin(s)
CCC → DDD    YY coin(s)
0x97F47JF6 → 0x77T56YUY    YY coin(s)
EEE → FFF    YY coin(s)
.
.
.

EXTRACTION

INQUIRE OF BLOCKCHAIN
ABOUT PRESENCE OR
ABSENCE OF CHANGE
TRANSACTION

→ REMITTANCE AVAILABLE

CONFIRMATION
INFORMATION

TO DECRYPTION PROCESSING UNIT 21

INFORMATION COMMUNICATION DEVICE AND INFORMATION COMMUNICATION PROGRAM

CROSS REFERENCE TO RELATED APPLICATIONS

This application claims the benefit of priority of Japanese Patent Application No. 2024-150826, filed on Sep. 2, 2024, the contents of which are incorporated by reference as if fully set forth herein in their entirety.

TECHNICAL FIELD

The present invention relates to an information communication system, including an information communication device and program, that enables highly reliable groupware using a blockchain.

BACKGROUND ART

A technique of synchronizing data via the Internet is disclosed in Patent Literature 1 (hereinafter referred to as "PL 1"). In the technique disclosed in PL 1, accounting data entered into an accounting processing device is treated as a primary accounting file, and when a transmission instruction is given, the primary accounting file is treated as an attachment, and attached to a transmission notification email and stored in a primary accounting file for each client of the accounting processing device via the Internet. After corrections are made on the accounting processing device displayed on a screen, synchronization processing is performed for the received data of the primary accounting file and an official accounting file when a synchronization instruction operation is given. Then, after the synchronization processing is completed, the synchronized primary file is treated as an attachment, and attached to a transmission notification email and stored in the primary accounting file of the accounting processing device via the Internet. Then, after an email is received, synchronization processing is performed for the received data of the primary accounting file and the official accounting file.

The inventors have developed a technique disclosed in Patent Literature 2 (hereinafter referred to as "PL 2") as a technique of using a blockchain to ensure legitimate transmission and reception of electronic data. The technique disclosed in PL 2 includes an email sending unit that sends electronic data to another computer, and a remittance control unit that generates a remittance transaction for accessing a blockchain of a digital currency and broadcasts it to the blockchain. When the email sending unit sends the electronic data, the remittance control unit generates accordingly the remittance transaction of the digital currency with respect to the electronic data and broadcasts it to the blockchain. The technique disclosed in PL 2 further includes an email receiving unit that receives electronic data from another computer, and a reception control unit that, when the email receiving unit receives the electronic data, accesses accordingly the blockchain to check a deposit status of the digital currency from a sender of the electronic data and confirms the reception of the electronic data in accordance with the deposit status.

CITATION LIST

Patent Literature

PL 1: Japanese Patent No. 4817404
PL 2: Japanese Patent No. 6583841

SUMMARY OF INVENTION

However, in the technique disclosed in PL 1, files that have been transmitted and received cannot be authenticated, and thus it would be vulnerable in terms of security. Further, in the technique disclosed in PL 2, although a security risk is significantly reduced by authentication, shared electronic data cannot be synchronized, and thus this technique would be insufficient as a groupware technology.

To solve the problems described above, an object of the present invention is to provide an information communication device and an information communication program capable of functioning as groupware that can share information using a blockchain on a network connected in a peer-to-peer manner without a shared server.

Solution to Problem

An aspect of the present invention provides an information communication device constituting an information communication system that is constructed through a peer-to-peer connection and uses a blockchain to operate groupware for managing group information shared among a plurality of members in a sharable state without a shared server. The information communication device is used individually by each member forming a group. The information communication device includes: storage means for having a storage area left for each member, the storage area storing the group information shared among the plurality of members; transaction issuance means for issuing a first transaction to the blockchain when a first member has performed a predetermined operation to change a content of first group information in a first storage area from a first information communication device used by the first member, the first transaction indicating that the predetermined operation has been performed on the first group information; transmission means for transmitting the first group information after the predetermined operation to a second member; transaction confirmation means for accessing, when reception of second group information from a third member is detected, the blockchain to confirm presence or absence of a second transaction indicating that the third member has performed a predetermined operation to change a content of the second group information in a second storage area from a second information communication device used by the third member; and update means for reflecting, when the presence of the second transaction newly issued has been confirmed, the second group information transmitted from the second information communication device, as legitimate information, in group information in the first storage area corresponding to the second group information. The second member may be same as or different from the third member.

Thus, the information communication device according to the aspect of the present invention authenticates, when the predetermined operation to change the content of group information has been performed on the group information in the storage area left in the storage means, the change in the group information by accessing the blockchain, and reflects the received group information as legitimate group information, provided that the authentication has been successful. This make it possible to reliably share and manage the group information while accurately determining whether the received group information is legitimate information by accessing the blockchain.

BRIEF DESCRIPTION OF DRAWINGS

FIG. 3 is a diagram showing the processing of a transaction issuance unit in the information communication device according to the first embodiment of the present invention;

FIG. 5 is a diagram showing the processing of a transaction confirmation unit in the information communication device according to the first embodiment of the present invention;

DESCRIPTION OF EMBODIMENTS

First Embodiment of the Present Invention

Figure 1:
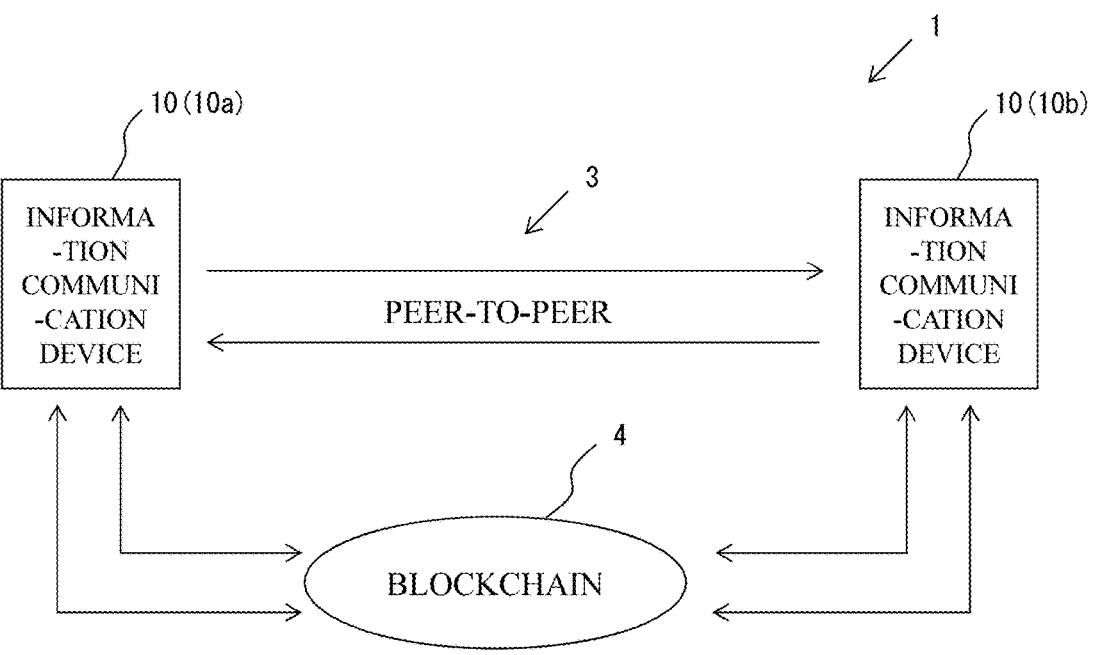
FIG. 1 is a system configuration diagram of an information communications system using an information communication device according to a first embodiment of the present invention.

An information communication device according to the present embodiment will be described with reference to FIGS. 1 to 11. The information communication device according to the present embodiment is a device that operates groupware that enables a plurality of members to share group information on a network constructed by a peer-to-peer connection without a shared server, and ensures the security of the shared group information by using a blockchain.

In the following embodiment, the shared server includes a file sharing server and an authentication server for implementing a login function, and does not include a mail server. Note that a configuration that does not include the shared server includes a configuration that does not include both the file sharing server and the authentication server, as well as a configuration that does not include either the file sharing server or the authentication server. Further, group information shared among multiple members includes shared information such as shared files, shared messages, shared schedules, shared links, shared images (still images and video images), shared tasks, and shared minutes.

Further, the terms used in the following embodiment will be defined as follows.

(1) Blockchain

Blockchain is a type of distributed database. Data is sequentially accumulated in units called blocks. Each block records hash values up to the immediately preceding block. This necessitates, in order to falsify data in the middle, the calculation of hash values for all data following a block to be falsified. This makes it difficult to falsify data in the blockchain.

(2) Digital Currency

Digital currency is any virtual currency realized by blockchain technology. Some digital currencies, such as famous Bitcoin and Ethereum, have actual monetary value, but there are also many digital currencies that do not have monetary value. Blockchain technology causes the digital currency to be extremely difficult to counterfeit or replicate.

(3) Wallet

Wallet is a mechanism for storing or managing digital currency. There are various forms, from a web wallet that is stored online, to a cold wallet that is stored on a terminal disconnected from a network. Digital currency users own digital currency on their wallets, and digital currency is sent and received between the wallets.

(4) Wallet Account

Wallet account is an ID that identifies a wallet. Each user manages digital currency through a unique wallet account. In the above-mentioned Bitcoin and Ethereum, the hash value of a public key is used as the wallet account.

(5) Transaction

Transaction is digital currency transaction data recorded on the blockchain. It is typically data that records a remittance from one wallet account to another wallet account. A wallet account that sends digital currency needs to sign a transaction that describes one's own wallet account and a destination wallet account with one's own private key and send it to issue the transaction.

(6) Mining

Mining is a process of combining a plurality of issued transactions into one block that can be recorded on the blockchain and recording it at the head of the blockchain. The wallet account that performs this process is called a miner. The recordation on the blockchain by the miner causes a transaction history to be confirmed in an unfalsifiable manner. It takes a few minutes from the issuance of a transaction to the confirmation thereof.

(7) Mail Send Coin (Hereinafter Referred to as "MSC")

MSC is a digital currency implemented in the present invention as a type of virtual currency. This is a type of digital currency that is not intended to have monetary value, and can be sent additionally when sending an email.

FIG. 1 is a system configuration diagram of an information communication system using an information communication device according to the present embodiment. In FIG. 1, an information communication system 1 is composed of a communication network 3 that is used individually by each member of a group and is constructed by a plurality of information communication devices 10 connected in a peer-to-peer manner, and a blockchain 4 that accumulates transactions broadcast from each of the plurality of information communication devices 10 and functions as a distributed database.

Suppose, for example, one information communication device 10 (hereinafter referred to as the first information communication device 10a) and another information communication device 10 (hereinafter referred to as the second information communication device 10b) are connected in a peer-to-peer manner, and each device has the same file that has been previously sent from one device to the other (hereinafter referred to as a shared file). In the information communication system 1 of FIG. 1, a shared server is not provided, so that the first information communication device 10a and the second information communication device 10b each hold the same shared file in their local storage areas. At this time, when the first member who uses the first information communication device 10a changes the shared file, this changed file is sent to the second information communication device 10b. In addition, the first information communication device 10a broadcasts, to the blockchain 4, a transaction indicating that the shared file has been changed (hereinafter referred to as a change transaction) from a shared account of the first member of the first information communication device 10a to a shared account of the second member using the second information communication device 10b. Here, the shared account is identification information for identifying each member of the same group in a groupware, and may use, for example, an email address or an SNS ID.

Note that the change transaction may use information indicating that MSC has been sent from a wallet account of the first member to a wallet account of the second member as a proof that the shared file has been changed, or may record content indicating a fact that the first member has changed the shared file. That is, it is sufficient to record the fact that the first member has changed the shared file and a time when the first member has changed the shared file, or it is sufficient to record changed contents in a form that can identify them (in a form, such as a change ID, that can uniquely identify the changed contents). Specifically, for example, sending a hash value of the shared file after the change to the blockchain 4 makes it possible to prove that the changed contents received in a peer-to-peer manner has been indeed changed by the first member.

The second information communication device 10b provisionally receives the shared file sent from the first information communication device 10a. Here, provisional reception refers to, for example, a state in which information is received but not displayed to the member who has received it (i.e., a state in which changed contents of group information have not been reflected, as described below), or a state in which only a notification that the shared file has been changed (or sent after the change operation) is received, and the shared file itself has not yet been received. Upon the provisional reception of the shared file, the second information communication device 10b accesses the blockchain 4 and checks whether or not there is the above change transaction. When the above change transaction is confirmed to be on the blockchain 4, the second information communication device 10b identifies the provisionally received shared file as the latest legitimate shared file (or, when only the notification has been received, the second information communication device 10b transmits, to the first information communication device 10a, information indicating that the shared file can be received as a legitimate shared file, and receives the changed shared file transmitted from the first information communication device 10a in response to that information), and overwrites the shared file stored in the local storage area of the second information communication device 10b.

When transmitting the shared file, the first information communication device 10a transmits it in a state of being encrypted using a public key of the second member who uses the second information communication device 10b which is the shared file destination, that is, the wallet account used as the public key as described above. When receiving the encrypted shared file as a legitimate shared file, the second information communication device 10b decrypts it with the second member's own private key corresponding to the second member's public key. This makes it possible to authenticate the sender of the shared file using the blockchain 4, and ensure the confidentiality and security of the shared file to be transmitted.

Figure 2:
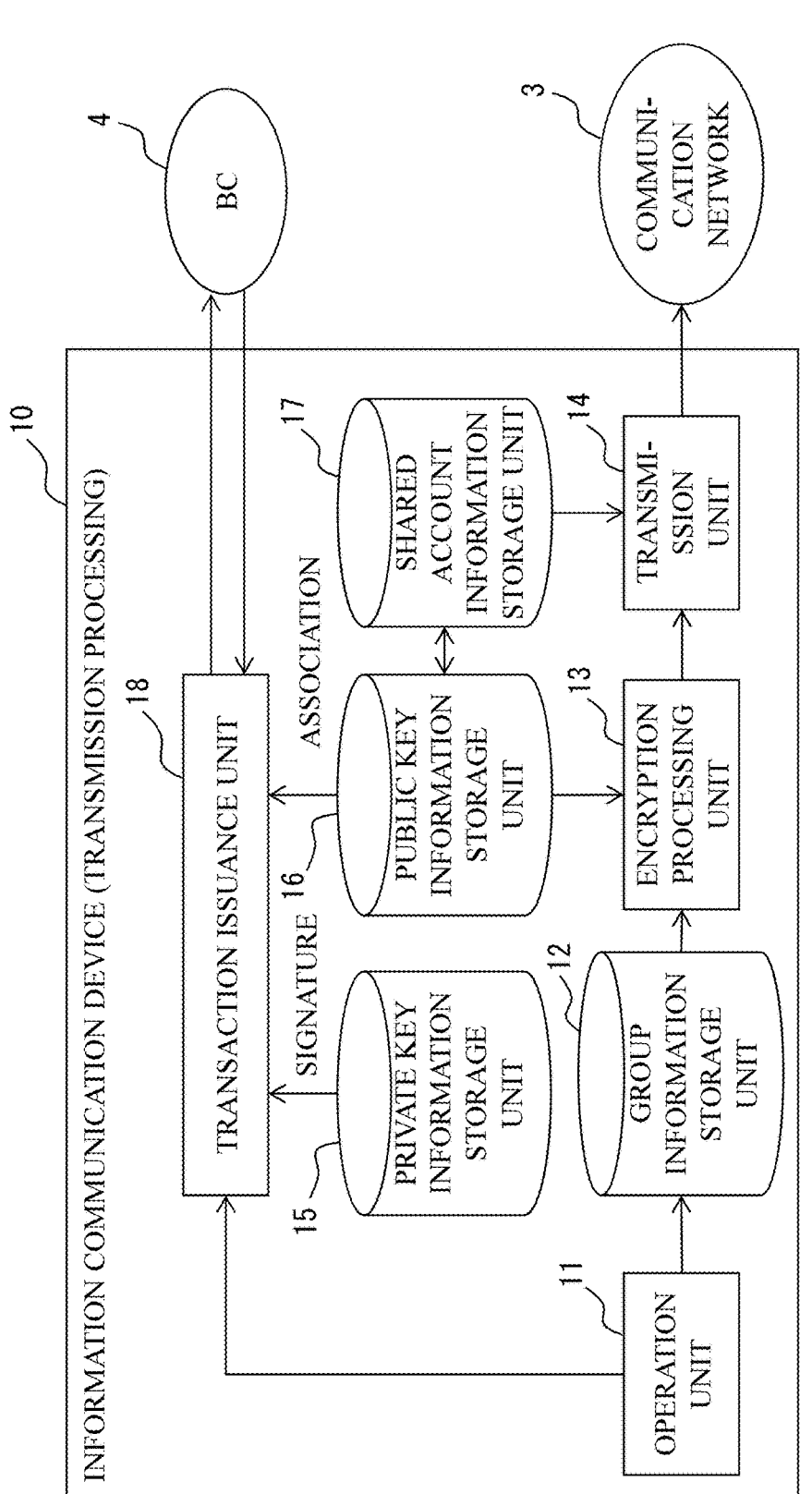
FIG. 2 is a functional block diagram showing a configuration that functions when transmitting information in the information communication device according to the first embodiment of the present invention.

FIG. 2 is a functional block diagram showing a configuration that functions when transmitting information in the information communication device according to the present embodiment. In FIG. 2, the information communication device 10 includes: an operation unit 11 that performs processing corresponding to an operation performed by a member, on group information stored in a group information storage unit 12; an encryption processing unit 13 that encrypts target data, which is the target of the operation performed by the operation unit 11, with a public key (wallet account) stored in a public key information storage unit 16; a transmission unit 14 that transmits the encrypted target data to an account stored in a shared account information storage unit 17 using a communication network 3; and a transaction issuance unit 18 that, in response to the operation performed by the operation unit 11, reads out information on one or more wallet accounts of one or more members who share the target data from the public key information storage unit 16, generates a change transaction indicating that the member has changed the group information, and signs the generated change transaction using private key information stored in a private key information storage unit 15 and broadcasts it to the blockchain (BC) 4.

Each component will be described in detail. The group information storage unit 12 stores group information shared between members of the same group in a groupware. This group information includes various shared information such as the shared files and the shared schedules as described above. When a member who is a user of the information communication device 10 performs an operation to make changes, such as addition, update, and/or deletion, to the group information stored in the group information storage unit 12, using an input device such as a keyboard, a mouse, a touch panel, and a microphone, the operation unit 11 performs group information change processing in accordance with the input signal, where the group information change processing includes processing associated with the change of the group information, for example, processing such as an operation to send the changed group information. Further, in response to the operation unit 11's performing the group information change processing, the transaction issuance unit 18 performs change transaction issuance processing.

Here, the processing of the transaction issuance unit 18 will be explained. FIG. 3 is a diagram showing the processing of the transaction issuance unit in the information communication device according to the present embodiment. The public key information storage unit 16 stores a wallet account, which is identification information required to access the blockchain 4, for each member of the same group in the groupware. The wallet account information is a hash value of the public key of each member, and thus has a function of identifying the public key. Further, the shared account information storage unit 17 stores a shared account for each member of the same group in the groupware, which is identification information for identifying said each member. These wallet accounts and shared accounts are stored in one-to-one correspondence. The transaction issuance unit 18 extracts a wallet account corresponding to one's own shared account, and extracts all wallet accounts corresponding to shared accounts of all shared members who share the target data that has been changed. These wallet accounts are used to create a transaction indicating that the MSC is to be sent from the member who has performed the change operation through the operation unit 11 to the other shared members as the change transaction.

Note that the one's own shared account and the corresponding wallet account may be registered in advance in the public key information storage unit 16 and the shared account information storage unit 17, or a separate dedicated storage means may be provided.

Further, when a wallet account of a shared member is unknown, a public key of the shared member may be once requested to the blockchain 4 to acquire public key information. The acquired public key information is stored in the public key information storage unit 16, and no request to the blockchain 4 is required in the subsequent processing.

When the change transaction is created, the change transaction is signed with the one's own private key stored in the private key information storage unit 15, enabling the created change transaction to be broadcast to the blockchain 4 and then MSC remittance information (i.e., information indicating that the member who has performed the change operation has changed the target data of the group information) to be written in the blockchain 4. Since it is extremely difficult to falsify the blockchain 4, the remittance information written here is highly reliable, and thus can function as highly reliable information to prove that the change processing has been performed to the target data.

Returning to FIG. 2, in parallel with (or before or after) the creation of the change transaction by the transaction issuance unit 18, the encryption processing unit 13 encrypts the changed target data with the public key of the shared member stored in the public key information storage unit 16. In other words, when there is a plurality of shared members, the encryption is performed individually for each member with the corresponding public key. Then, each encrypted target data is sent by the transmission unit 14 to the account of each shared member.

Figure 4:
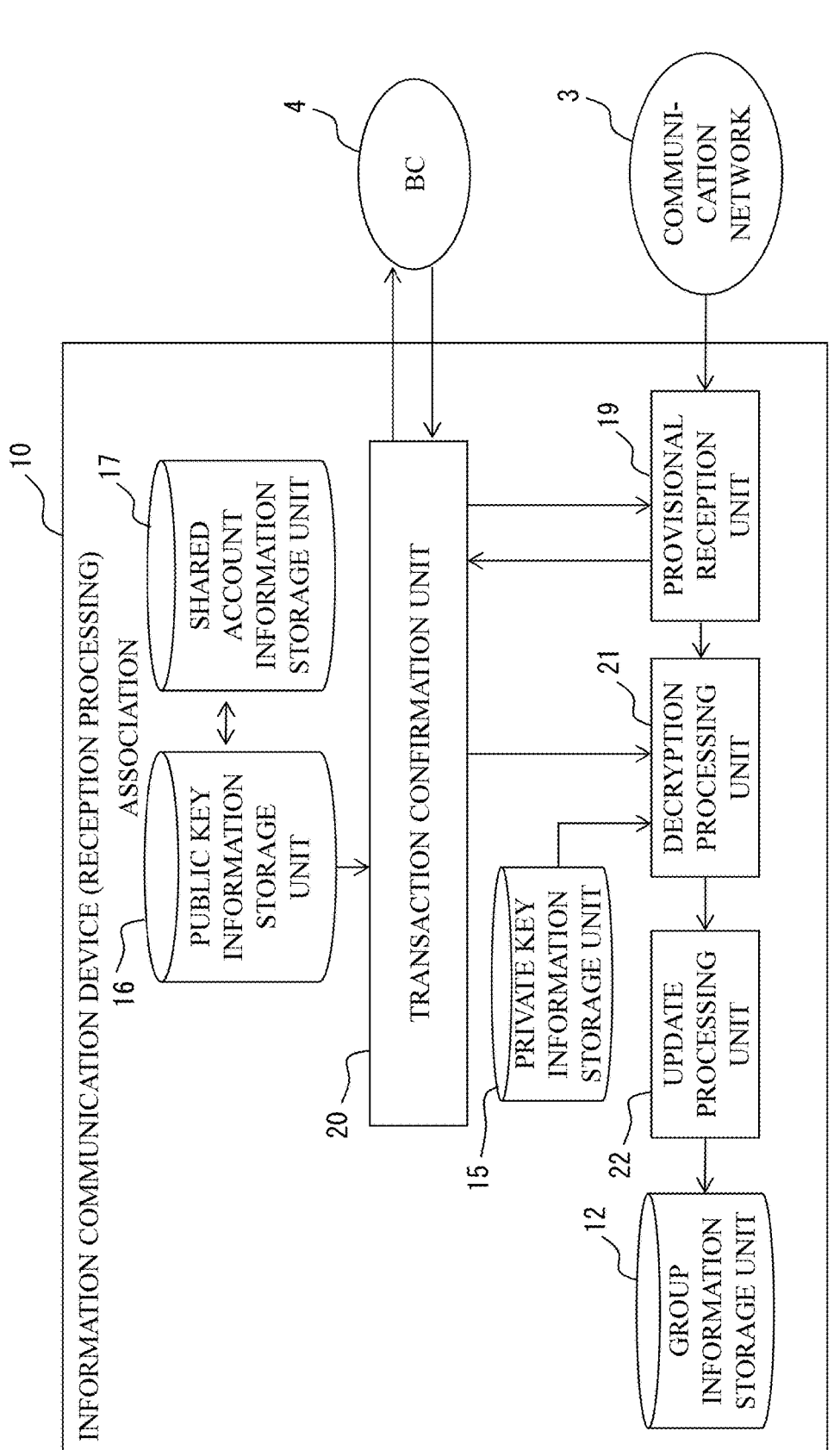
FIG. 4 is a functional block diagram showing a configuration that functions when receiving information in the information communication device according to the first embodiment of the present invention.

FIG. 4 is a functional block diagram showing the configuration that functions when receiving information in the information communication device according to the present embodiment. In FIG. 4, the information communication device 10 includes: a provisional reception unit 19 that receives, when another shared member has changed the group information stored in the group information storage unit 12 and transmitted it to each shared member, the changed target data, where the target data received here has been encrypted with the one's own public key as described above; a transaction confirmation unit 20 that, in response to the reception of the target data by the provisional reception unit 19, reads out the wallet account corresponding to the account of the another shared member who is the sender, from the public key information storage unit 16, and queries the blockchain 4 to confirm whether or not there is the change transaction issued by said wallet account; a decryption processing unit 21 that decrypts, when it is confirmed that there is a change transaction on the blockchain 4, the target data received by the provisional reception unit 19 with the one's own private key stored in the private key information storage unit 15; and an update processing unit 22 that updates the target data in the group information storage unit 12 with the decrypted target data.

Each component will be described in detail. The provisional reception unit 19 receives the target data after the change operation performed to the group information by the another shared member, but at this stage, the target data received has not been confirmed to be a legitimate target data (i.e., target data whose sender is guaranteed), thus being in a provisional reception state. This provisional reception includes, for example, a state in which the target data itself has been received but has been provisionally stored in a storage area that cannot be accessed by the member's operation, or a state in which only a prior notice that the target data is to be sent (for example, a message such as "The target data has been changed by the member XX") has been received and the target data itself has not been sent yet, or a state in which the target data remains in an email receiving server in a case of the target data being an email.

When the provisional reception unit 19 performs the provisional reception as described above, the transaction confirmation unit 20 confirms the change transaction. FIG. 5 is a diagram showing the processing of the transaction confirmation unit in the information communication device according to the present embodiment. In FIG. 5, the transaction confirmation unit 20 extracts the corresponding wallet account from the account of the another shared member who is the sender of the target data provisionally received by the provisional reception unit 19, using the public key information storage unit 16 and the shared account information storage unit 17. Further, the transaction confirmation unit 20 extracts the corresponding wallet account from the one's own shared account. Then, using these extracted wallet accounts, the transaction confirmation unit 20 queries the blockchain 4 to confirm whether or not there is a change transaction from the wallet account of the another shared member to the one's own wallet account. When it is confirmed that there is the change transaction, the process proceeds to the processing of the decryption processing unit 21 based on the confirmation information. When there is no change transaction, the provisional reception unit 19 ignores the provisional reception, or deletes the provisionally received target data, or makes an inquiry to the sender, for example, based on the confirmation information.

Note that, in this case also, the one's own shared account and the corresponding wallet account may be registered in advance in the public key information storage unit 16 and the shared account information storage unit 17, or a separate dedicated storage means may be provided.

Further, when a wallet account of a shared member is unknown, a public key of the shared member may be once requested to the blockchain 4 to acquire public key information. The acquired public key information is stored in the public key information storage unit 16, and no request to the blockchain 4 is required in the subsequent processing.

Returning to FIG. 4, when the transaction confirmation unit 20 has confirmed that there is a change transaction, the decryption processing unit 21 decrypts, assuming that the target data provisionally received by the provisional receiving unit 19 is legitimate target data changed by another shared member, the provisionally received target data with the one's own private key stored in the private key information storage unit 15. That is, the target data sent from another shared member is encrypted using the one's own public key (wallet account information), and thus can be decrypted using the corresponding private key, as described in the block diagram of FIG. 2.

Since the transaction confirmation unit 20 has confirmed that the decrypted target data is reliable and this is such data that has been changed by another shared member, the update processing unit 22 overwrites the decrypted target data in the group information storage unit 12 as legitimate group information. This allows the members to share synchronized group information.

Figure 6:
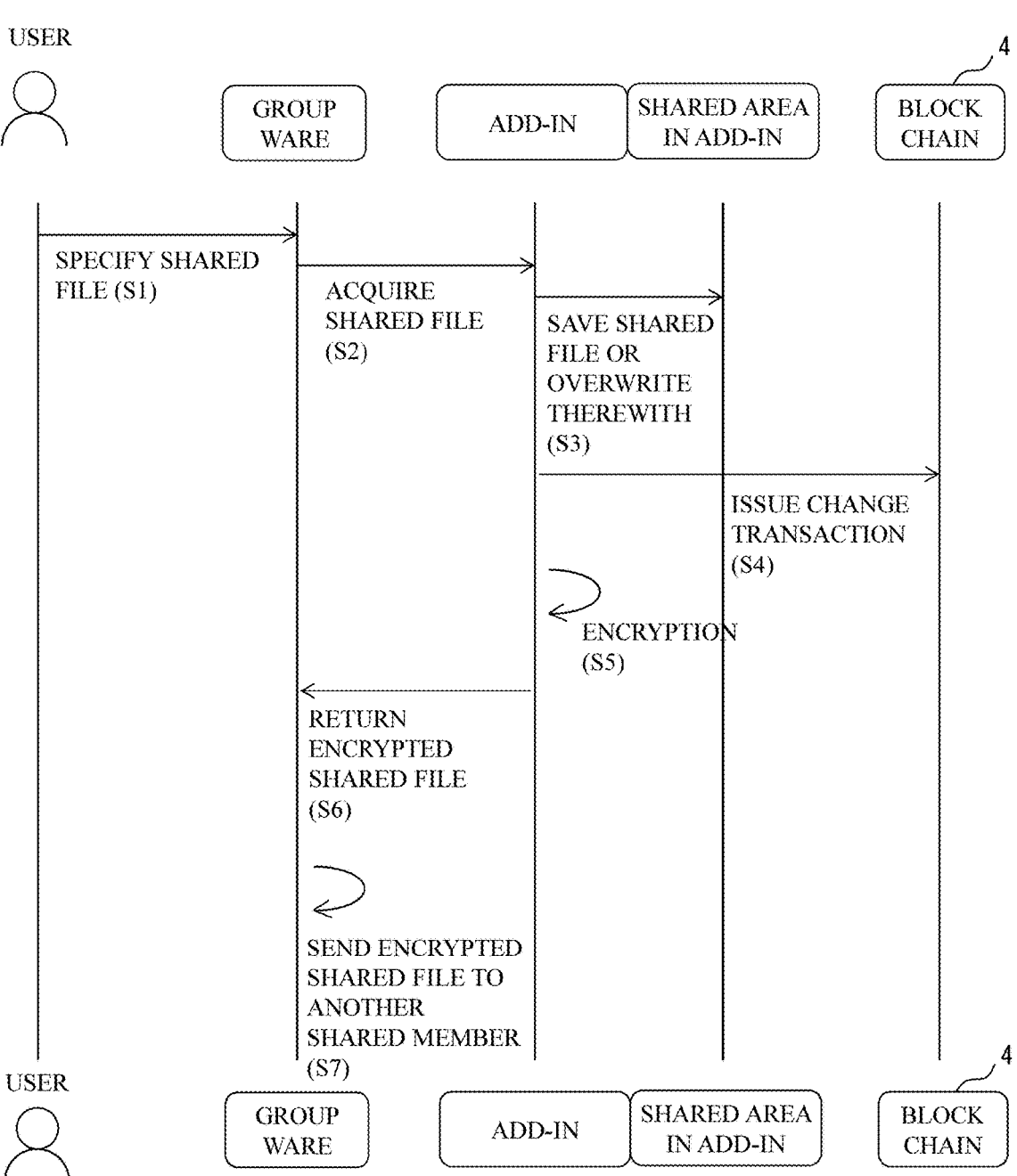
FIG. 6 is a flow diagram showing shared file transmission processing when a shared file in one's own local area is edited in the information communication device according to the first embodiment of the present invention.
Figure 7:
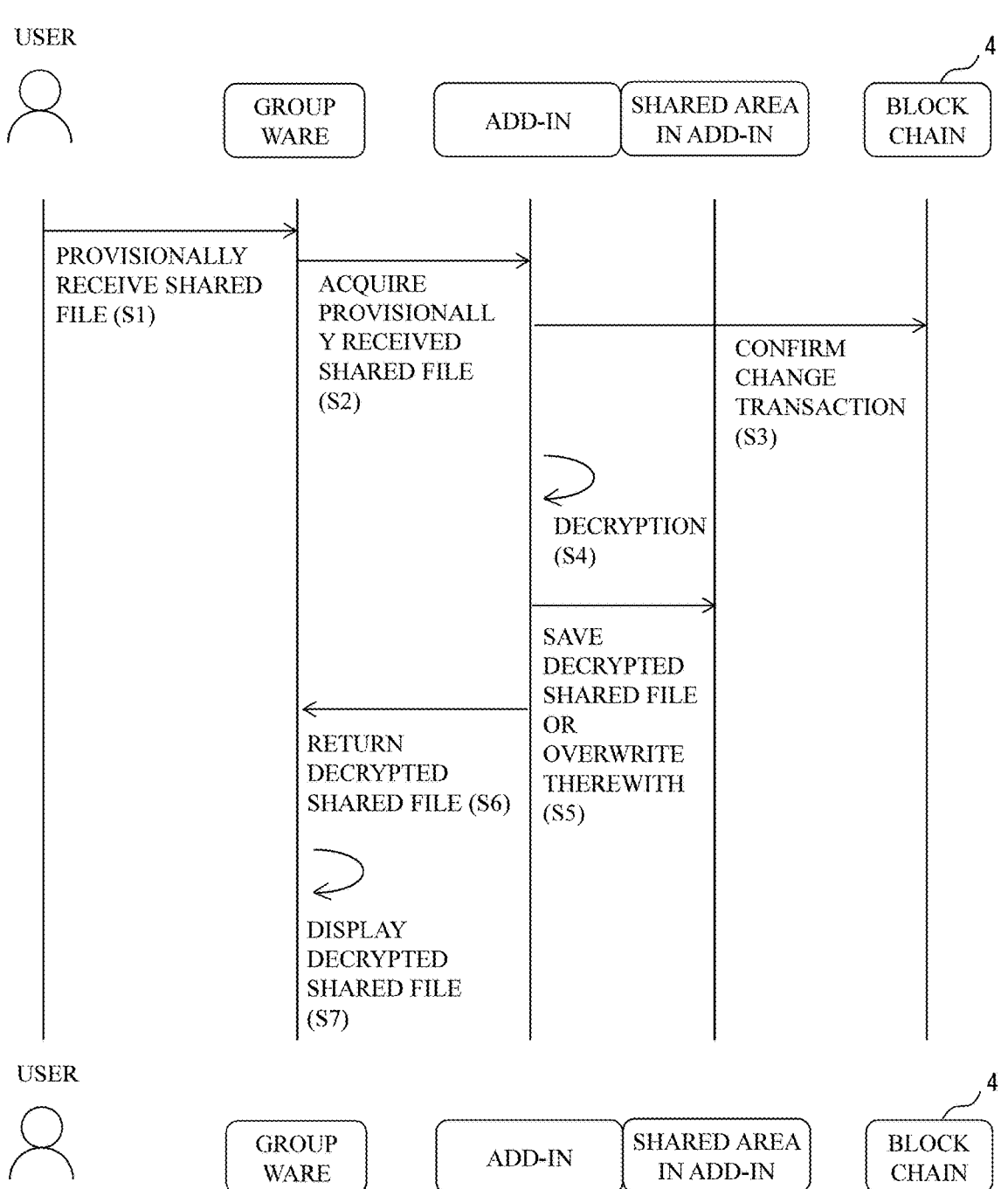
FIG. 7 is a flow diagram showing shared file reception processing when a shared file in another member's local area is edited in the information communication device according to the first embodiment of the present invention.

Next, the processing of the information communication device 10 in the above configuration will be described. FIG. 6 is a flow diagram showing shared file transmission processing when a shared file in one's own local area is edited in the information communication device according to the present embodiment, and FIG. 7 is a flow diagram showing shared file reception processing when a shared file in another member's local area is edited in the information communication device according to the present embodiment. FIGS. 6 and 7 each show a process performed among common groupware installed in the information communication device 10, an add-in that extends the function of the groupware (where the add-in has a shared area), the blockchain 4, and a user.

First, in FIG. 6, a user uses the function of the operation unit 11 to specify a file intended to be shared (hereinafter referred to as a "shared file") to the groupware. Or, when the file is already shared, the user specifies the shared file (S1). When the target shared file is specified, the add-in acquires the shared file (S2), and saves (adds) the shared file in the group information storage unit 12 which is a file sharing area in the add-in, or overwrites the existing shared file after editing thereof (S3). The transaction issuance unit 18 of the add-in detects that a predetermined operation (for example, an operation for changing group information by adding or editing a shared file) has been performed on the shared file by the operation unit 11, and issues a change transaction to the blockchain 4 by the processing described above in FIG. 3 (S4). Further, the encryption processing unit 13 of the add-in encrypts the acquired shared file by using a public key of another member who is intended to share (or who has already shared) this acquired shared file (S5). The add-in returns the encrypted shared file to the groupware (S6), and the transmission unit 14 of the groupware sends the encrypted shared file to the another member who is intended to share this encrypted shared file (S7), and this transmission processing ends.

When an encrypted shared file is sent from another member, the processing of FIG. 7, which will be described below, is performed. In FIG. 7, the provisional reception unit 19 of the groupware receives (provisionally receives) the shared file, when a user operates the groupware, or in accordance with a shared information acquisition mode set in advance in the groupware (S1). When the add-in has acquired the shared file received by the provisional reception unit 19 (S2), the transaction confirmation unit 20 confirms whether or not there is a change transaction to the blockchain 4 through the processing described above in FIG. 5 (S3). When it is confirmed that there is a change transaction, the decryption processing unit 21 decrypts the shared file, which has been encrypted with one's own public key, with one's own private key (S4), and the update processing unit 22 saves (adds) the decrypted shared file in the group information storage unit 12 which is a file sharing area in the add-in, or overwrites an existing shared file (S5). At the same time, the decrypted shared file is returned to the groupware (S6), and the groupware displays this decrypted shared file (S7), and this reception processing ends.

In this case, it is possible to share local group information (shared files) among group members with security and confidentiality guaranteed, without having both a file sharing server and an authentication server, as shown in the processes of FIGS. 6 and 7.

Figure 8:
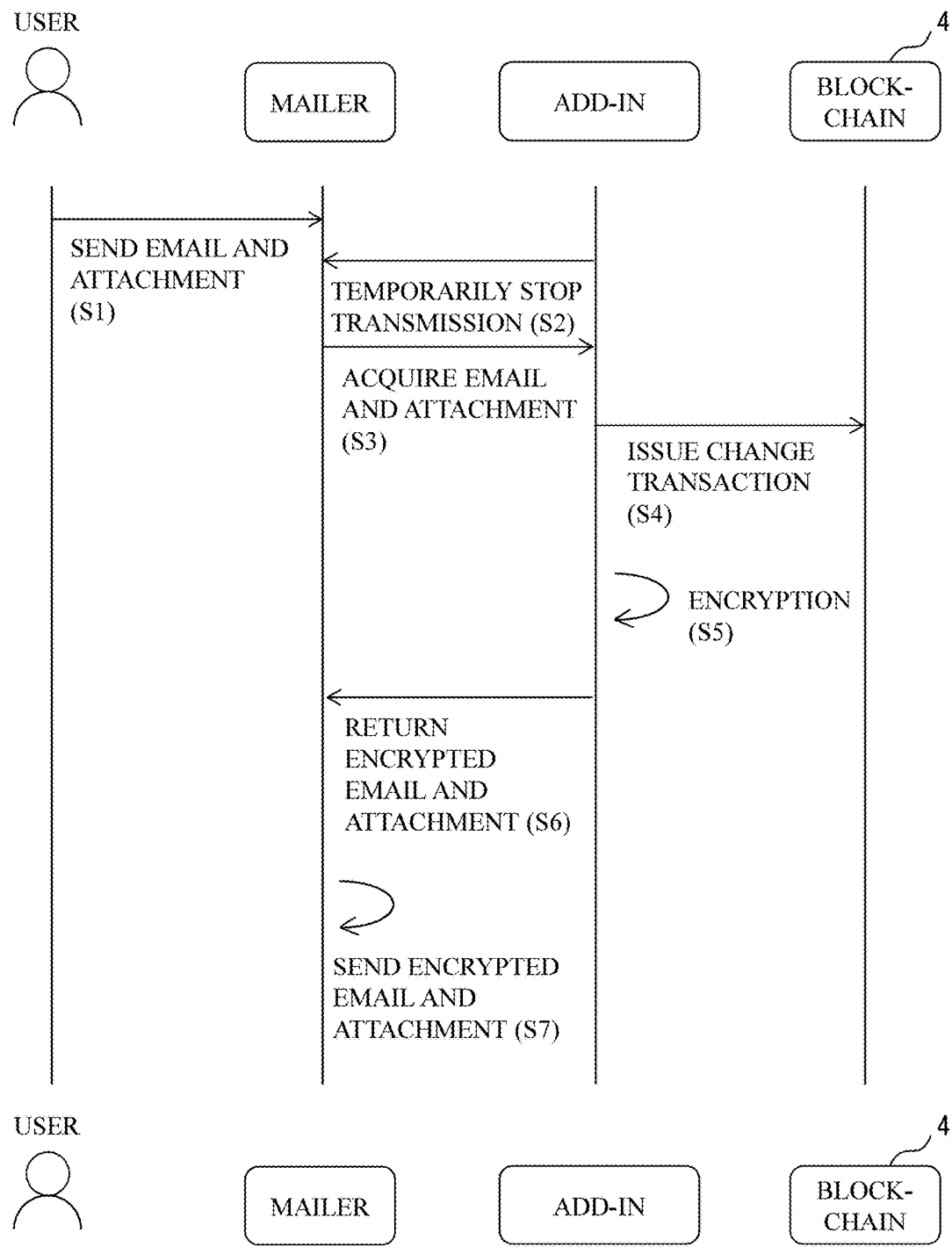
FIG. 8 is a flow diagram showing transmission processing when an attachment to be attached to an email is shared in the information communication device according to the first embodiment of the present invention.
Figure 9:
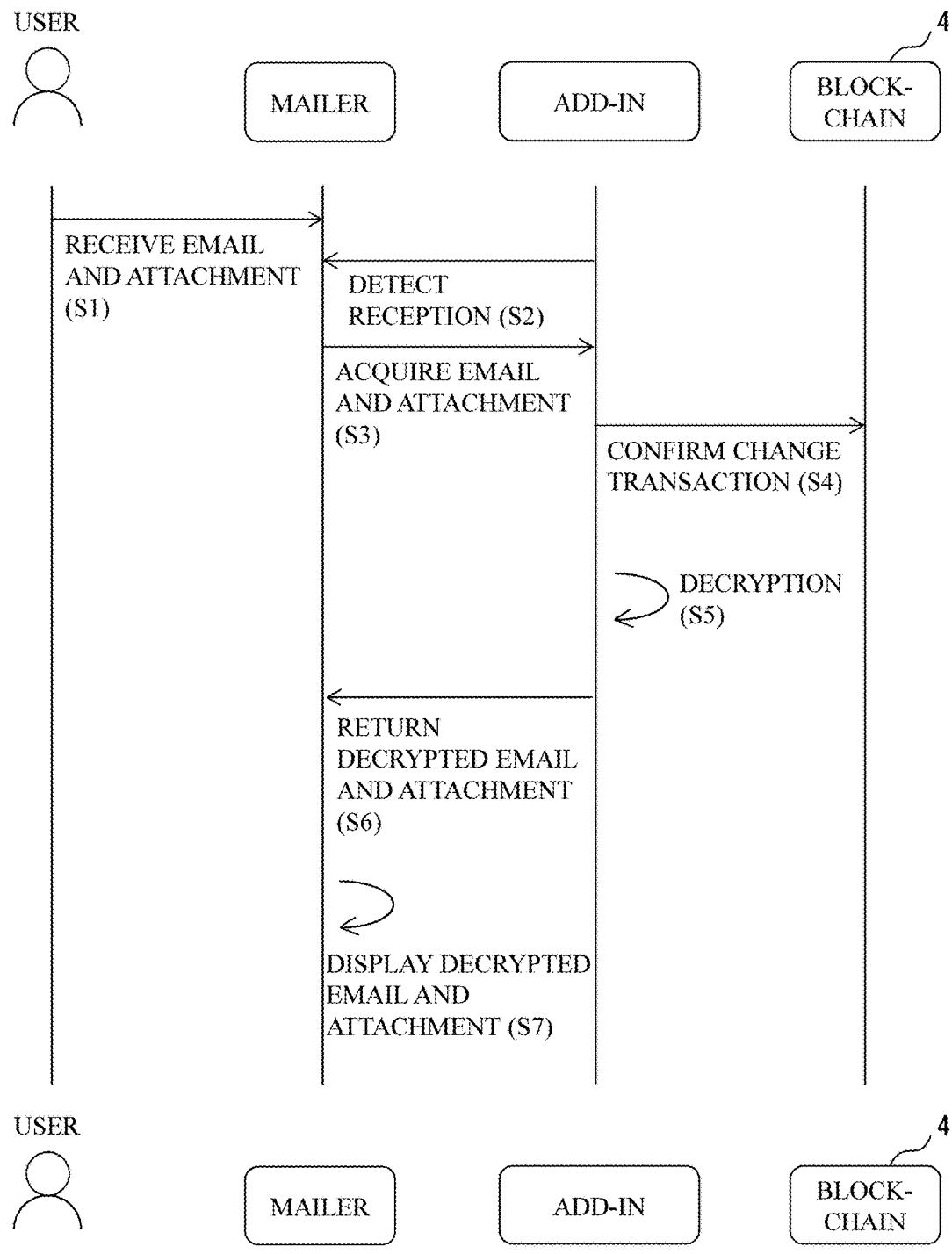
FIG. 9 is a flow diagram showing reception processing when an attachment sent by an email is shared in the information communication device according to the first embodiment of the present invention.

FIG. 8 is a flow diagram showing transmission processing when an attachment to be attached to an email is shared in the information communication device of the present embodiment, and FIG. 9 is a flow diagram showing reception processing when an attachment sent by an email is shared in the information communication device of the present embodiment. In FIGS. 8 and 9, a common email sending and receiving software (hereinafter referred to as a "mailer") installed in the information communication device 10 is used as groupware, and each shows a process performed among an add-in that extends the function of said mailer, the block chain 4, and a user.

First, in FIG. 8, a user performs an operation to send an email and an attachment to the email by the mailer using the function of the operation unit 11 (S1). The add-in temporarily stops the operated transmission processing (S2) and acquires the email and the attachment (S3). At this time, the body of the email and the attachment may be stored in the group information storage unit 12 which is a file sharing area in the add-in, as in the case shown in FIG. 6, or may be stored in any local area by the user. In response to the operation of sending the email with the attachment by the operation unit 11, the transaction issuance unit 18 of the add-in issues a change transaction to the block chain 4 by the processing described above in FIG. 3 (S4). Further, the encryption processing unit 13 of the add-in encrypts the acquired email and attachment by using a public key of a destination member to whom said email is to be sent (S5). The add-in returns the encrypted email and attachment to the transmission unit 14 of the mailer (S6). The transmission unit 14 then transmits the encrypted email and attachment to a mail server (S7), and this processing ends.

In FIG. 8, the case where both an email and an attachment are encrypted has been described. However, when confidentiality is not required for the body of the email, only the attachment may be encrypted, or when confidentiality is not required for the attachment, only the body of the email may be encrypted.

When encrypted email and attachment are sent from another member, the processing of FIG. 9, which will be described below, is performed. In FIG. 9, when a user operates the mailer, or in accordance with the setting for automatically acquiring an email set in the mailer, the provisional reception unit 19 of the mailer checks the presence or absence of received email and attachment to the mail server, and provisionally receives them (S1). The provisional reception here may be a state in which the provisionally received email and attachment are downloaded into the add-in, or may be a state in which they are left in the mail server. When the add-in detects the provisional reception of the email by the provisional reception unit 19 (S2), it acquires the email and attachment (S3). When the add-in acquires the email and attachment, the transaction confirmation unit 20 confirms whether or not there is a change transaction to the blockchain through the processing described above in FIG. 5 (S4). When it is confirmed that there is a change transaction, the decryption processing unit 21 decrypts the email and attachment, which have been provisionally received by the provisional reception unit 19 or the mail server and encrypted with one's own public key, using one's own private key (S5), and the update processing unit 22 returns the decrypted email and attachment to the mailer and saves the attachment in the group information storage unit 12 (S6). The mailer displays the email and the attachment (S7), and this reception processing ends.

In this case as well, it is possible to share emails and attachments as group information without having both a file sharing server and an authentication server, as shown in the processes of FIGS. 8 and 9. In other words, it is possible to share group information (in this case, to send and receive emails and attachments) among members with security and confidentiality guaranteed, without sharing a password in advance or performing authentication such as logging in.

Figure 10:
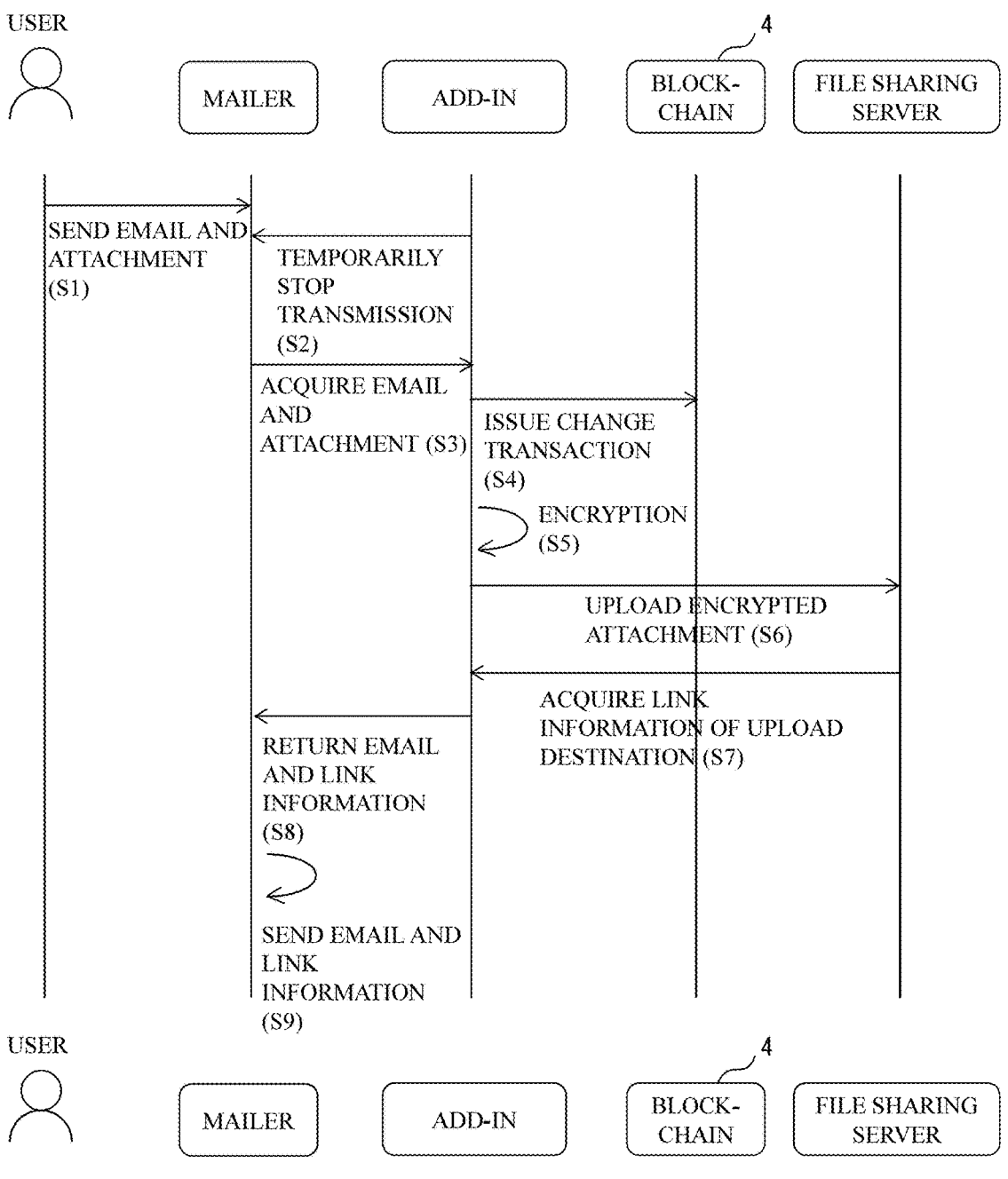
FIG. 10 is a flow diagram showing transmission processing when an attachment to be attached to an email is shared on a shared server in the information communication device according to the first embodiment of the present invention.
Figure 11:
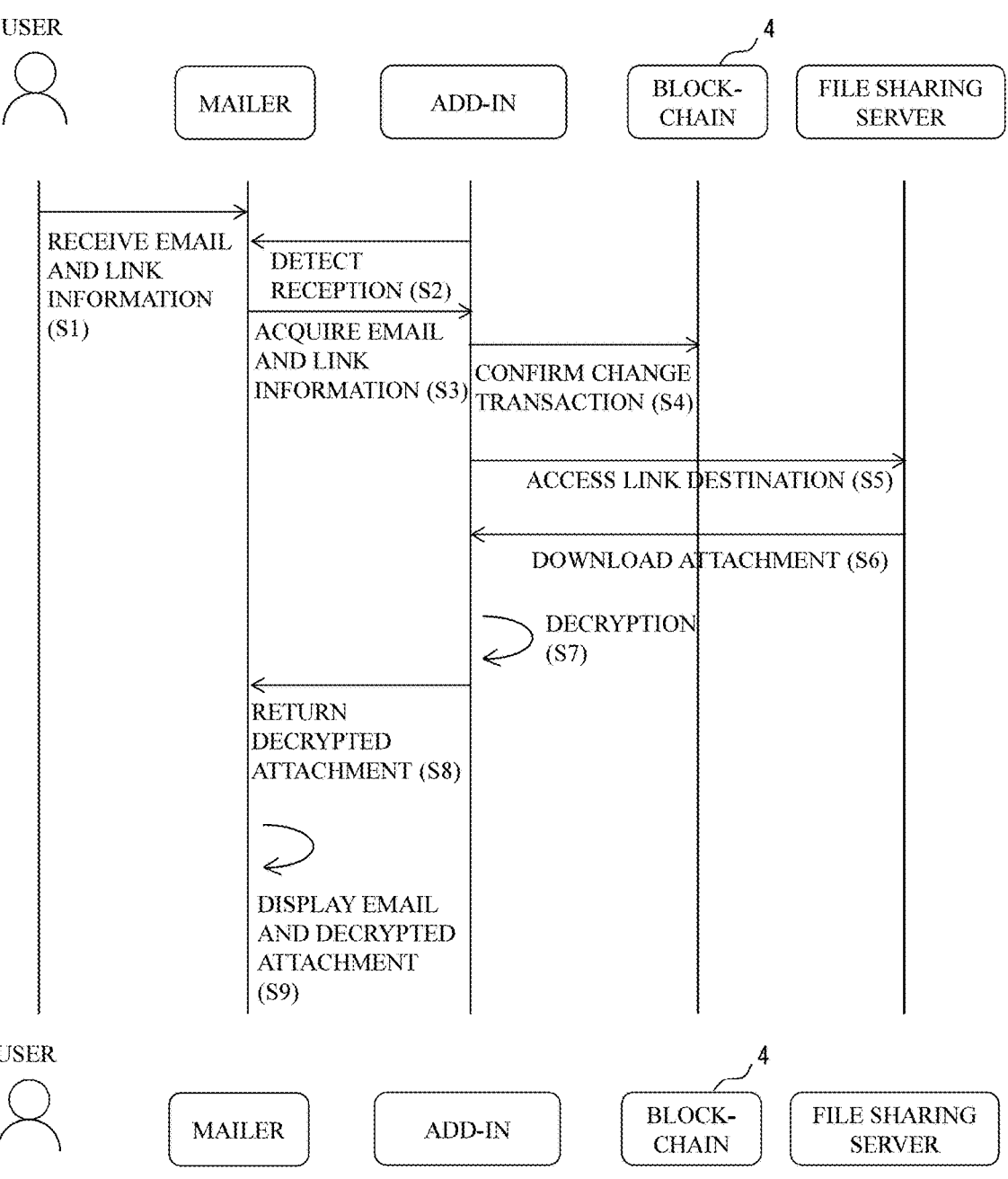
FIG. 11 is a flow diagram showing reception processing when an attachment sent by an email is shared on a shared server in the information communication device according to the first embodiment of the present invention.

FIG. 10 is a flow diagram showing the transmission processing when an attachment to be attached to an email is shared on a shared server in the information communication device of the present embodiment, and FIG. 11 is a flow diagram showing reception processing when an attachment sent by an email is shared on a shared server in the information communication device of the present embodiment. FIGS. 10 and 11 each show a process performed among a mailer installed in the information communication device 10, an add-in that extends the function of said mailer, the blockchain, a file sharing server that is commonly provided as an external storage service, and a user.

First, in FIG. 10, a user performs an operation to send an email and an attachment to the email by the mailer using the function of the operation unit 11 (S1). The add-in temporarily stops the operated transmission processing (S2) and acquires the email and the attachment (S3). At this time, the body of the email and the attachment may be stored in the group information storage unit 12 which is a file sharing area in the add-in, as in the case of FIG. 8, or may be stored in any local area by the user. In response to the operation of sending the email with the attachment by the operation unit 11, the transaction issuance unit 18 of the add-in issues a change transaction to the blockchain 4 by the processing described above in FIG. 3 (S4). Further, the encryption processing unit 13 of the add-in encrypts the acquired attachment by using a public key of a destination member to whom said email is to be sent (S5). An upload unit (not shown in FIG. 2) of the add-in uploads the encrypted attachment to a file sharing server (S6) and acquires link information of the upload destination (S7). The upload unit returns the acquired link information and the email to the transmission unit 14 of the mailer (S8). The transmission unit 14 sends an email including the link information of the upload destination of the attachment to the mail server (S9), and this transmission processing ends.

When an email including a link destination of an attachment is sent from another member, the processing of FIG. 11, which will be described below, is performed. In FIG. 11, when a user operates the mailer, or in accordance with the setting for automatically acquiring an email set in the mailer, the provisional reception unit 19 of the mailer checks whether or not an email has been received to the mail server, and receives an email including a link destination of an attachment (S1). When the add-in detects the provisional reception of the email by the provisional reception unit 19 (S2), it acquires the email including the link destination of the attachment (S3). The transaction confirmation unit 20 confirms whether or not there is a change transaction to the blockchain through the processing described above (S4). When it is confirmed that there is a change transaction, a download unit (not shown in FIG. 4) of the add-in accesses the link destination included in the email (S5) and downloads an attachment (S6). The download unit returns the downloaded attachment to the decryption processing unit 21, and the decryption processing unit 21 decrypts the attachment encrypted with one's own public key, using one's own private key (S7). The update processing unit 22 returns the decrypted attachment to the mailer and saves the attachment in the group information storage unit 12 (S8). The mailer displays the email and the attachment (S9), and this reception processing ends.

Note that in the above embodiment, the upload unit and the download unit are functions of the add-in, but the transmission unit 14 and the provisional reception unit 19 of the mailer may perform these functions. In other words, since the mailer and the add-in function in an integrated manner, there is no need to clearly distinguish them in terms of configuration, and the transmission unit 14 may function as the upload unit and the provisional reception unit 19 may function as the download unit.

In this case, it is possible to share group information on a file sharing server without having an authentication server, as shown in the processes of FIGS. 10 and 11. In other words, since there is no need for authentication such as logging in, it is not necessary to share a password in advance, and it is possible to share group information (in this case, to send and receive attachments) with security and confidentiality guaranteed on a file sharing server that can be accessed by anyone (the general public).

Thus, the information communication device 10 according to the present embodiment is the information communication device 10 constituting the information communication system 1 that is constructed through a peer-to-peer connection and uses the blockchain 4 to operate groupware for managing group information shared among a plurality of members in a sharable state without a shared server. The information communication device 10 is used individually by each member forming a group. The information communication device 10 includes: the group information storage unit 12 that has a storage area left for each member, the storage area storing the group information shared among the plurality of members; the transaction issuance unit 18 that issues one transaction to the blockchain 4 when one member has performed a predetermined operation to change a content of one group information in one storage area from one information communication device 10 used by the one member, the one transaction indicating that the predetermined operation has been performed on the one group information; the transmission unit 14 that transmits the one group information after the predetermined operation to another member; the transaction confirmation unit 20 accessing, when reception of another group information from another member is detected, the blockchain 4 to confirm presence or absence of another transaction indicating that the another member has performed a predetermined operation to change a content of the another group information in another storage area from another information communication device 10 used by the another member; and the update processing unit 22 that reflects, when the presence of the another transaction newly issued has been confirmed, the another group information transmitted from the another information communication device 10, as legitimate information, in group information in the one storage area corresponding to the another group information. This causes the information communication device 10 to authenticate, when the predetermined operation to change the content of group information has been performed, the change in the group information by accessing the blockchain 4, and to reflect the received group information as legitimate group information, provided that the authentication has been successful. Thus, this make it possible to reliably share and manage the group information in a peer-to-peer manner while accurately determining whether the received group information is legitimate information by accessing the blockchain 4, without having both a file sharing server and an authentication server.

Further, optionally, the information communication device 10 includes: the encryption processing unit 13 that encrypts the one group information after the predetermined operation with a public key corresponding to a blockchain account of the another member who shares the one group information; and the decryption processing unit 21 that decrypts the received another group information with a private key corresponding to the one member's blockchain account, the private key being held by the one member. This makes it possible to utilize the mechanism of the blockchain 4 to send and receive group information while maintaining confidentiality using public key cryptography.

Further, optionally, the group information includes information on an email and/or information on an attachment attached to the email; the transaction issuance unit 18 issues, when the one member has performed a sending operation to send the email and/or the attachment corresponding to the one group information to the another member, the one transaction to the blockchain 4, the one transaction indicating that the sending operation has been performed; the transmission unit 14 sends the email and/or the attachment corresponding to the one group information, to an email address of the another member; the transaction confirmation unit 20 accesses, when it is confirmed that the email and/or the attachment has been sent from the another member, the blockchain 4 to confirm presence or absence of the another transaction indicating that the another member has performed a sending operation to send the email and/or the attachment corresponding to the another group information to the one member; and the update processing unit 22 stores for the reflection, when the presence of the another transaction newly issued has been confirmed, the email and/or the attachment corresponding to the another group information in the one storage area as legitimate information. This makes it possible to send and receive emails and attachments while maintaining confidentiality, and to authenticate senders and recipients by the blockchain 4.

Furthermore, optionally, the group information includes information on an attachment attached to an email; the transaction issuance unit 18 issues, when the one member has performed a sending operation to send the attachment corresponding to the one group information to the another member, the one transaction to the blockchain 4, the one transaction to the blockchain 4, the one transaction indicating that the sending operation has been performed; the transmission unit 14 uploads the attachment corresponding to the one group information to an external storage shared with the another member, and sends link information to an email address of the another member by email, the link information indicating a storage location of the attachment in the external storage; the transaction confirmation unit 20 accesses, when link information has been received from the another member by email, the blockchain 4 to confirm presence or absence of the another transaction indicating that the another member has performed a sending operation to send the attachment corresponding to the another group information to the one member; and the update processing unit 22 accesses, when the presence of the another transaction newly issued has been confirmed, an external storage indicated by the link information received by email to download the attachment into the one storage area as legitimate information for the reflection. This makes it possible to share group information on a peer-to-peer file sharing server without an authentication server, and there is no need for authentication such as logging in to the file sharing server, thus enabling group information to be shared with security and confidentiality guaranteed on the file sharing server that can be accessed by anyone (the general public).

Furthermore, optionally, the group information includes shared information stored in the storage area left locally in the group information storage unit 12 within the information communication device 10 used individually by each member; the transaction issuance unit 18 issues the one transaction to the blockchain 4 when the one member has performed a change operation to change the content of the one group information stored in the one storage area, the one transaction indicating that the change operation has been performed; the transmission unit 14 transmits the changed one group information to the another member; the transaction confirmation unit 20 accesses, when it is confirmed that the another member has changed the content of the another group information stored in the another storage area, the blockchain 4 to confirm presence or absence of another transaction indicating that the another member has changed the another group information; and the update processing unit 22 reflects, when the presence of the second transaction newly issued has been confirmed, the another group information transmitted from the another information communication device 10, as legitimate information, in group information in the one storage area corresponding to the another group information. This makes it possible to share group information stored locally in a peer-to-peer manner with security and confidentiality guaranteed among the members, without having both a file sharing server and an authentication server.

REFERENCE SIGNS LIST

1 Information communication system
3 Communication network
4 Blockchain (BC)
10 Information communication device
11 Operation unit
12 Group information storage unit
13 Encryption processing unit
14 Transmission unit
15 Private key information storage unit
17 Shared account information storage unit
18 Transaction issuance unit
19 Provisional reception unit 20 Transaction confirmation unit
21 Decryption processing unit
22 Update processing unit

The invention claimed is:

1. An information communication device constituting an information communication system that is constructed through a peer-to-peer connection and uses a blockchain to operate groupware for managing group information shared among a plurality of members in a sharable state without a shared server, the information communication device being used individually by each member forming a group, the information communication device comprising:
   one or more processors;
   memory storing instructions, an operation unit, a transaction issuance unit, a transmission unit, a provisional reception unit, a transaction confirmation unit, and an update processing unit;
   a storage having a storage area for each member, the storage area storing the group information shared among the plurality of members;
   wherein the instructions that, when executed by the one or more processors, cause the one or more processors to perform operations comprising:
   processing, via the operation unit, addition, update, and/or deletion operations, on one group information of one storage area;
   detecting, via the transaction issuance unit, that the processing by the operation unit has been performed;
   issuing, via the transaction issuance unit, one transaction to the blockchain in response to the detecting, the one transaction indicating that the operation has been performed on the one group information;
   transmitting, via the transmission unit, the one group information after the operation to another member;
   receiving, via the provisional reception unit, another group information sent from the another member;
   accessing, via the transaction confirmation unit, based on that the provisional reception unit has provisionally received the another group information, the blockchain, wherein the accessing further comprises confirming presence or absence of another transaction indicating that the another member has performed an operation to change a content of another group information in another storage area from another information communication device used by the another member; and
   reflecting, via the update processing unit, based on that the presence of the another transaction newly issued has been confirmed, the another group information transmitted from the another information communication device, as legitimate information, in group information in the one storage area corresponding to the another group information.

2. The information communication device according to claim 1, the memory further storing an encryption processing unit and a decryption processing unit, wherein the instructions that, when executed by the one or more processors, further cause the one or more processors to perform the operations of:
   encrypting, via the encryption processing unit, the one group information after the operation with a public key corresponding to a blockchain account of another member who shares the one group information; and
   decrypting, via the decryption processing unit, the received another group information with a private key corresponding to a blockchain account of the one member, the private key being held by the one member.

3. The information communication device according to claim 1, further comprising:
   wherein the group information comprises information on an email and/or information on an attachment attached to the email;
   performing, via the operation unit, a sending operation to send the email and/or the attachment as the one group information to the another member;
   issuing, via the transaction issuance unit, in response to the sending operation, the one transaction to the blockchain;
   sending, via the transmission unit, the email and/or the attachment as the one group information, to an email address of the another member;
   receiving, via the provisional reception unit, the email and/or the attachment from the another member;
   accessing, via the transaction confirmation unit, based on the provisional reception unit has received the email and/or the attachment, the blockchain, wherein the accessing further comprises confirming presence or absence of another transaction issued when the another member has sent the email and/or the attachment as the another group information to the one member; and
   reflecting, via the update processing unit, based on that the presence of the another transaction newly issued has been confirmed, the email and/or the attachment as the another group information in the one storage area as legitimate information.

4. The information communication device according to claim 1, further comprising:
   wherein the group information comprises information on an attachment attached to an email;
   performing, via the operation unit, a sending operation to send the attachment as the one group information to the another member;
   issuing, via the transaction issuance unit, in response to the sending operation, the one transaction to the blockchain;
   uploading, via the transmission unit, the attachment as the one group information to an external storage shared with the another member, and;
   sending, via the transmission unit, link information to an email address of the another member by email, the link information indicating a storage location of the attachment in the external storage;
   receiving, via the provisional reception unit, the link information from the another member by email;
   accessing, via the transaction confirmation unit, based on that the provisional reception unit has received the link information by email, the blockchain, wherein the accessing further comprises confirming presence or absence of another transaction issued when the another member has sent the attachment as the another group information to the one member; and
   reflecting, via the update processing unit, based on that the presence of the another transaction newly issued has been confirmed, an external storage indicated by the link information received by email to download the attachment into the one storage area as legitimate information for the reflection.

5. The information communication device according to claim 1, further comprising:
   wherein the group information comprises shared information stored in the storage area left locally in the storage within the information communication device used individually by each member;

processing, via the operation unit, addition, update, and/or deletion operations, on the shared information as the one group information stored in the one storage area;

detecting, via the transaction issuance unit, the processing by the operation unit has been performed; and issuing, via the transaction issuance unit, the one transaction to the blockchain in response to the detecting;

transmitting, via the transmission unit, the shared information as the one group information on which the processing corresponding to the operation has been performed, to a second member;

receiving, via the provisional reception unit, the shared information from the another member;

accessing, via the transaction confirmation unit, based on that the provisional reception unit has received the shared information, the blockchain, wherein the accessing further comprises confirming presence or absence of another transaction indicating that the another member has added, updated, and/or deleted the another group information; and reflecting, via the update processing unit, based on that the presence of the another transaction newly issued has been confirmed, the another group information transmitted from the another information communication device, as legitimate information, in group information in the one storage area corresponding to the another group information.

6. A non-transitory computer-readable storage medium storing an information communication program, wherein the information communication program comprises an operation unit, a transaction issuance unit, a transmission unit, a provisional reception unit, a transaction confirmation unit, an update processing unit, for an information communication system constructed through a peer-to-peer connection and using a blockchain to operate groupware for managing group information shared among a plurality of members in a sharable state without a shared server, when the information communication program executed by the one or more processors, causing the one or more processors to perform functions comprising:

processing, via the operation unit, addition, update, and/or deletion operations, on one group information of one storage area in storage means for having a storage area for storing the group information left;

detecting, via the transaction issuance unit, that the processing by the operation unit has been performed;

issuing, via the transaction issuance unit, one transaction to the blockchain in response to the detecting, the one transaction indicating that the operation has been performed on the one group information;

transmitting, via the transmission unit, the one group information after the operation to another member;

receiving, via the provisional reception unit, another group information sent from the another member;

accessing, via the transaction confirmation unit, based on that the provisional reception unit has provisionally received the another group information, the blockchain, wherein the accessing further comprises confirming presence or absence of another transaction indicating that the another member has performed an operation to change a content of another group information in another storage area from another information communication device used by the another member; and reflecting, via the update processing unit, based on that the presence of the another transaction newly issued has been confirmed, the another group information transmitted from the another information communication device, as legitimate information, in group information in the one storage area corresponding to the another group information.

* * * * *